United States Patent
Wang

(10) Patent No.: US 9,010,347 B2
(45) Date of Patent: Apr. 21, 2015

(54) PORTABLE AWNING FOR THE CAR

(76) Inventor: Xiaopeng Wang, Guangdong (CN)

(*) Notice: Subject to any disclaimer, the term of this patent is extended or adjusted under 35 U.S.C. 154(b) by 0 days.

(21) Appl. No.: 14/110,156

(22) PCT Filed: Mar. 9, 2012

(86) PCT No.: PCT/CN2012/000298
§ 371 (c)(1),
(2), (4) Date: Oct. 7, 2013

(87) PCT Pub. No.: WO2013/131209
PCT Pub. Date: Sep. 12, 2013

(65) Prior Publication Data
US 2014/0034099 A1    Feb. 6, 2014

(30) Foreign Application Priority Data
Mar. 6, 2012  (CN) .................. 2012 2 0079213 U

(51) Int. Cl.
*E04H 15/06* (2006.01)
*B60J 11/04* (2006.01)
*E04H 15/08* (2006.01)

(52) U.S. Cl.
CPC ............... *E04H 15/06* (2013.01); *B60J 11/04* (2013.01); *E04H 15/08* (2013.01)

(58) Field of Classification Search
USPC ........... 135/88.01, 88.05, 88.07, 95; 296/99.1
See application file for complete search history.

(56) References Cited

U.S. PATENT DOCUMENTS

| | | | | |
|---|---|---|---|---|
| 2,609,042 A * | 9/1952 | Chamberlain | ............... | 160/122 |
| 2,859,756 A * | 11/1958 | Barnes | ............... | 135/88.07 |
| 3,364,973 A * | 1/1968 | Railson | ............... | 160/22 |
| 3,906,969 A * | 9/1975 | Myers | ............... | 135/88.11 |
| 4,900,081 A * | 2/1990 | Lee | ............... | 296/136.12 |
| 5,192,111 A * | 3/1993 | Hanemaayer | ............... | 135/88.1 |
| 5,381,814 A * | 1/1995 | Brandon | ............... | 135/88.07 |
| 5,400,813 A * | 3/1995 | Swan, Jr. | ............... | 135/88.07 |
| 5,407,007 A * | 4/1995 | Lowrey | ............... | 160/22 |
| 5,558,145 A * | 9/1996 | Baka | ............... | 160/67 |
| 6,782,904 B2 * | 8/2004 | Tien | ............... | 135/88.07 |
| 7,086,684 B2 * | 8/2006 | Glaser et al. | ............... | 296/99.1 |
| 7,503,336 B2 * | 3/2009 | Labarbera | ............... | 135/16 |
| 7,604,281 B1 * | 10/2009 | Raynor | ............... | 296/99.1 |
| 8,267,105 B1 * | 9/2012 | Denmark, Jr. | ............... | 135/117 |
| 2007/0113879 A1 * | 5/2007 | Li | ............... | 135/88.07 |
| 2013/0180671 A1 * | 7/2013 | Deitz et al. | ............... | 160/84.05 |

* cited by examiner

*Primary Examiner* — Noah Chandler Hawk

(57) ABSTRACT

A portable awning for the car. The present invention is to overcome the deficiency of bad effect of insulation and inconvenience for user. The point of solution includes a casing able to be separated into two portions along the length direction, and an awning body able be stored within the said two portions of the casing respectively, is characterized in that: the said awning body is a foldable body with continuous honeycomb section, the said two portions of the casing are provided with fixed structure used for fixing the car. Each Honeycomb Tube of the said awning body is an opening structure at the both ends.

3 Claims, 3 Drawing Sheets

PORTABLE AWNING FOR THE CAR

FIELD OF INVENTION

The present invention relates to sun-shading equipment, more particularly, it relates to a portable awning for keeping the car away from the sunlight.

BACKGROUND OF THE INVENTION

People usually go out by driving car, it's unavoidable for parking in the open parking lot under sunlight. After sunlight exposure, not only affect the car's protective coating, but also leave the massive radiation inside the car where the temperature can reach above 50° C. People will feel hot and terrible when getting into the car, even can cause heatstroke in the summer time, or release the harmful gas to damage health. The usual method is: to open the air condition for cooling down the temperature before getting into the car, but it will be taken much of the driver's precious time and consumed more energy; or open the car window decrease the temperature by air convection, but it also need to be taken some time, this is uncomfortable for people who need to use car ungently. There was a cooling product by using chemical spray, which can cool down inside the car quickly by absorbing the hot air, nevertheless, it wasn't been widely used as a result of fearing about affecting the human inhalation on health. In addition, the China patent No. 200820066307.1 discloses an awning for the car, which is single layer of covering cloth covered on top of the car, but the car's insulation effect wasn't good due to the heat penetrating through the cloth, the other problem is that the covering cloth is not easy to fold and unfold. It was also not been widely used due to its inconvenient.

CONTENTS OF THE INVENTION

In order of overcome the deficiency of bad effect of insulation and inconvenience for user, the purpose of the present invention is to provide an improved portable awning for the car, which can solve the prior deficiency.

The present invention provided the point of the technical solution is: a portable awning for the car, comprising a casing able to be separated into two portions along the length direction, and an awning body able be stored within the said two portions of the casing respectively, is characterized in that: the said awning body is a foldable body with continuous honeycomb section, the said two portions of the casing are provided with fixed structure used for fixing the car.

Each Honeycomb Tube of the said awning body according to the aforementioned technical solution is an opening structure at the both ends, which is to increase the radiation effect.

The said foldable body with continuous honeycomb section according to the aforementioned technical solution can be one or more than two layers continuous honeycomb section structures.

The said fixed structure used for fixing car section according to the aforementioned technical solution are installed with permanent magnets or plastic suckers at the outer bottom of the casing for sucking the car shell, or hook or locking rope on the casing.

The outer bottom parts of the said casing where the permanent magnets or the plastic suckers are being installed according to the aforementioned technical solution are respectively the opening section of a tube, the permanent magnets or the plastic suckers are installed into the opening section the tube by fast detachable type which can be used in screw fit, tight fit or clip fit, the casing equipped with several supporting poles which are plugged into the opening section of a tube while unplugged the permanent magnets or the plastic suckers, the said portable awning is formed an portable floor-type awning to provide the car or people enjoying the cool, enlarge uses of the awning.

The top of the awning body according to the aforementioned technical solution can be added with a reflective layer.

The casing according to the aforementioned technical solution can be equipped with handles or a locker which can lock two parts of the casing. The awning body according to the aforementioned technical solution can be used in thick cloth, waterproof cloth, or plastic sheet as a material The awning body with the continuous honeycomb section according to aforementioned technical solution, which is a regular hexagon or a tube body, are formed by connecting correspondingly; the shape of the honeycomb hole of the said continuous honeycomb section are not confined to regular hexagon, it can be a polygon.

The advantage of the present invention is: the awning have good insulation effect because of the foldable body with the continuous honeycomb section, especially when each Honeycomb Tube of the awning body is an opening structure at the both ends, it will increase the effects of heat dissipation; because the casing able to be separated into two portions along the length direction, and an awning body able be stored within the said two portions of the casing respectively, the awning body can be quickly, easily and widely applied. Moreover, the outer bottom parts of the said casing where the permanent magnets or the plastic suckers are being are respectively the opening section of a tube, the permanent magnets or the plastic suckers are installed into the opening section the tube by fast detachable type, the casing equipped with several supporting poles which are plugged into the opening section of a tube while unplugged the permanent magnets or the plastic suckers, the said portable awning is formed an portable floor-type awning to provide the car or people enjoying the cool, enlarge uses of the awning.

DETAILED DESCRIPTION OF THE INVENTION

Figure 1:
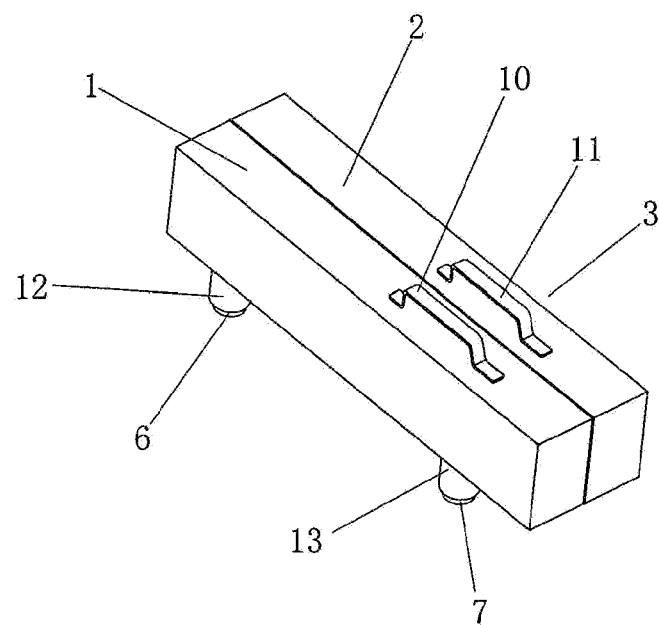
FIG. 1 is a schematic view of an embodiment of the collection status according to the present invention.
Figure 2:
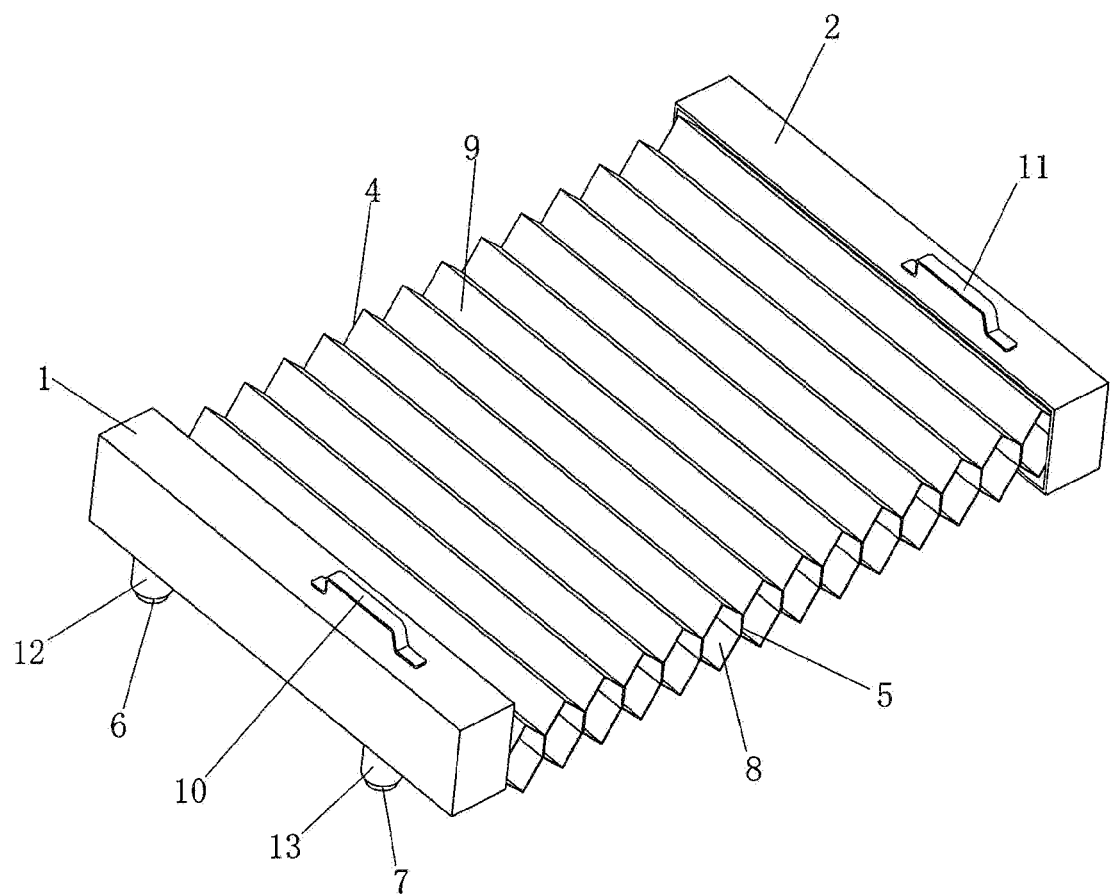
FIG. 2 is a schematic view of unfolding status of FIG. 1.

Referring to FIG. 1 and FIG. 2, a portable awning for the car, comprising a casing (3) able to be separated into two portions (1), (2) along the length direction, and an awning body (4) able be stored within the said two portions (1), (2) of the casing (3) respectively, is characterized in that: the said awning body (4) is a foldable body with continuous honeycomb section (5), the two portions (1), (2) of the casing are installed respectively with permanent magnets (6), (7) at the outer bottom of the casing for sucking the car shell.

In addition, each Honeycomb Tube (8) of the said awning body is an opening structure at the both ends; the top (9) of the awning body is added with a reflective layer; the casing (3) is equipped with handles (10), (11)or a locker which can lock two parts (1), (2) of the casing. (The locker is not shown)

Figure 3:
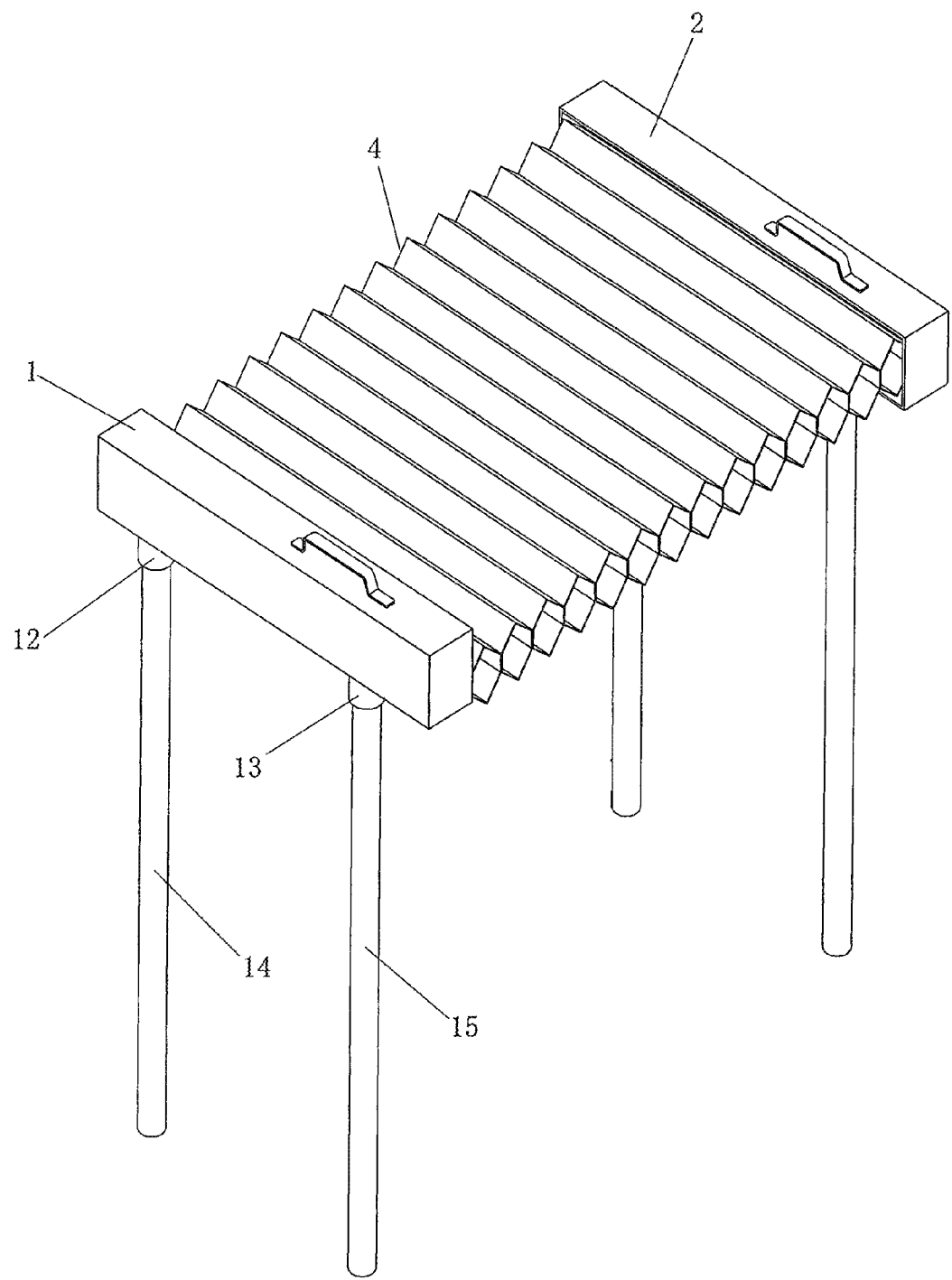
FIG. 3 is a schematic view of a floor-type awning of FIG. 2.

Referring to FIG. 3, the outer bottom parts of the said casing (3) where the permanent magnets (6), (7) are being installed are respectively the opening section of a tube (12), (13), the permanent magnets (6), (7) are installed into the opening section the tube (12), (13) by fast detachable type the casing (3) equipped with several supporting poles (14), (15).

When in use, separate and pull the two parts (1), (2) of the casing as FIG. 2, and put and absorb respectively the permanent magnets (6), (7) on the car shell for sun shading. Or remove out of the permanent magnets (6), (7) from the opening section the tube (12), (13) and then put the supporting poles (14), (15) into them respectively to become a portable floor-type awning for enjoy the cool as FIG. 3.

Figure 4:
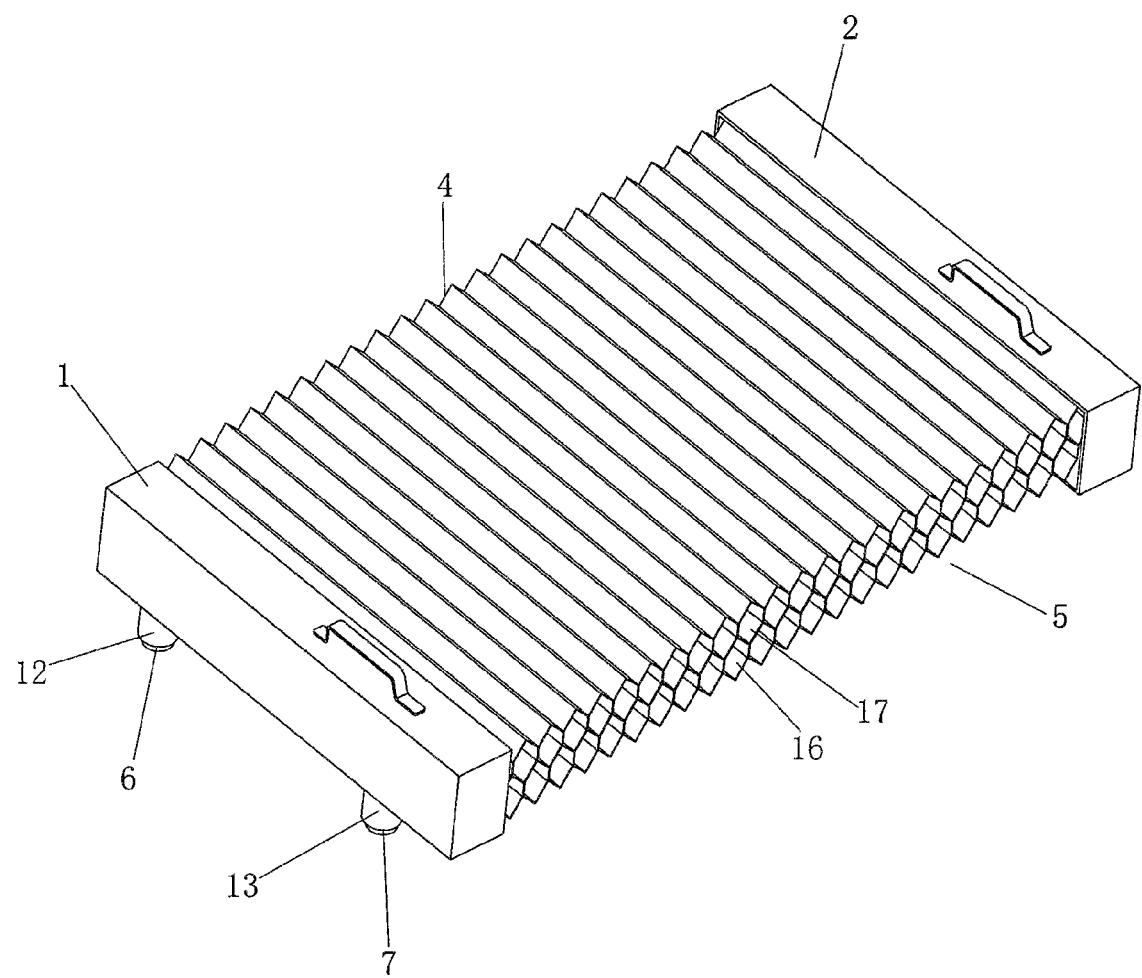
FIG. 4 is the other schematic view of unfolding status of FIG. 1.

Referring to FIG. 4, the awning body (4) of the portable awning for the car can be a foldable body with two layers of continuous honeycomb section (16), (17), in the same way, it also can be three or four layers structure, the more the layers, the better for insulation.

What is claimed is:

1. A portable awning for the car, comprising a casing separated into two portions along the length direction, and an awning body stored within said two portions of the casing respectively, said awning body being defined as a foldable body with continuous honeycomb cross section, said two portions of the casing having fixed structures configured to fix the car;

said fixed structures having permanent magnets disposed at an outer bottom of the casing to fix the car shell said outer bottom parts of said casing where the permanent magnets are installed being respectively opening tubes, the permanent magnets being freely installed into the opening tubes, the casing equipped with several supporting poles which are connected to the opening tubes when the permanent magnets are removed.

2. The portable awning for the car according to claim 1, characterized in that said continuous honeycomb cross section has an opening structures at the both ends thereof.

3. The portable awning for the car according to claim 1 or claim 2, characterized in that said foldable body has at least one layer of said continuous honeycomb cross section.

* * * * *